(12) United States Patent
Sashi et al.

(10) Patent No.: US 9,534,136 B2
(45) Date of Patent: Jan. 3, 2017

(54) MAGNETIC STEEL SHEET WITH SEMI-ORGANIC INSULATION COATING

(75) Inventors: Kazumichi Sashi, Tokyo (JP); Hiroyuki Ogata, Tokyo (JP); Chiyoko Tada, Tokyo (JP); Nobuko Nakagawa, Tokyo (JP); Nobue Fujibayashi, Tokyo (JP); Tomofumi Shigekuni, Tokyo (JP); Kenichi Sasaki, Tokyo (JP)

(73) Assignee: JFE Steel Corporation (JP)

( * ) Notice: Subject to any disclaimer, the term of this patent is extended or adjusted under 35 U.S.C. 154(b) by 554 days.

(21) Appl. No.: 13/810,798

(22) PCT Filed: Jul. 21, 2011

(86) PCT No.: PCT/JP2011/004123
§ 371 (c)(1),
(2), (4) Date: Jan. 17, 2013

(87) PCT Pub. No.: WO2012/011286
PCT Pub. Date: Jan. 26, 2012

(65) Prior Publication Data
US 2013/0115444 A1  May 9, 2013

(30) Foreign Application Priority Data
Jul. 22, 2010  (JP) .................. 2010-165380

(51) Int. Cl.
C09D 163/00 (2006.01)
C09D 5/08 (2006.01)
C09D 7/12 (2006.01)
C22C 38/00 (2006.01)
C23C 22/74 (2006.01)
H01F 1/18 (2006.01)
C22C 38/02 (2006.01)
C22C 38/04 (2006.01)

(52) U.S. Cl.
CPC ............ *C09D 163/00* (2013.01); *C09D 5/084* (2013.01); *C09D 7/1266* (2013.01); *C09D 7/1275* (2013.01); *C09D 7/1291* (2013.01); *C22C 38/00* (2013.01); *C22C 38/02* (2013.01); *C22C 38/04* (2013.01); *C23C 22/74* (2013.01); *H01F 1/18* (2013.01); *C23C 2222/20* (2013.01); *Y10T 428/259* (2015.01)

(58) Field of Classification Search
None
See application file for complete search history.

(56) References Cited

U.S. PATENT DOCUMENTS

2010/0233484 A1  9/2010  Shigekuni et al.

FOREIGN PATENT DOCUMENTS

| | | | |
|---|---|---|---|
| JP | 60-036476 B | | 8/1985 |
| JP | 10-046350 A | | 2/1998 |
| JP | 10-130858 A | | 5/1998 |
| JP | 2944849 B2 | | 9/1999 |
| JP | 2001-107261 | | 4/2001 |
| JP | 2003-253462 A | | 9/2003 |
| JP | 2003-268563 A | | 9/2003 |
| JP | 2005-268630 A | | 9/2005 |
| JP | 2007-197820 A | | 8/2007 |
| JP | 2007-197824 A | | 8/2007 |
| JP | 2008-303411 | | 12/2008 |
| JP | 2009-194314 A | | 8/2009 |

OTHER PUBLICATIONS

Masaki, et al., Electromagnetic steel sheet having insulating coating, CN 1934289A (Machine Translation).*
Yamamoto et al., Surface Treatment Composition for Steel Sheet. JP 2003-253462 (Machine Translation).*
Supplemental European Search Report issued Nov. 25, 2014 from corresponding European Application No. 11809461.4.
Taiwanese Office Action dated Nov. 12, 2013 for Taiwanese Application No. 100125994.
Chinese Official Action dated Feb. 8, 2014 from corresponding Chinese Patent Application No. 2011-80035140.7.
English translation of Russian Office Action dated Apr. I, 2014 from corresponding Russian Patent Application No. 2013107785.
Japanese Notice of Reasons for Rejection dispatched Apr. 8, 2014 along with an English translation from corresponding Japanese Application No. 2010-165380.
Korean Office Action dated Apr. 29, 2014 from corresponding Korean Patent Application No. 10-2013-7002933 along with English translation.
Canadian Official Action dated Jul. 17, 2014 from corresponding Canadian Patent Application No. 2,803,150.
Chinese Notification of Office Action dated Jul. 1, 2014 along with an English translation from corresponding Chinese Patent Application No. 201180035140.7.
Taiwanese Official Decision of Refusal dated Aug. 1, 2014 along with an English translation from corresponding Taiwanese Patent Application No. 10221540200.
Chinese Third Notification of Office Action dated Sep. 29, 2014 along with an English translation from corresponding Chinese Patent Application No. 201180035140.7.
European Office Action dated Jul. 17, 2015 of corresponding European Application No. 11809461.4.
Decision of Rejection dated Jan. 12, 2015 of corresponding Chinese Application No. 201180035140.7 with English translation.

* cited by examiner

*Primary Examiner* — Cheng Huang
(74) *Attorney, Agent, or Firm* — DLA Piper LLP (US)

(57) ABSTRACT

A semi-organic insulation coating includes an inorganic component and an organic resin, a Zr compound and an Si compound contains a plate-like silica as an inorganic component and are included in a ratio in a dry coating of 20 to 70 mass % of Zr compound (converted to $ZrO_2$) and 10 to 50 mass % of Si compound containing plate-like silica (converted to $SiO_2$), and the remainder is substantially an organic resin, whereby a magnetic steel sheet with a semi-organic insulation coating has no deterioration of corrosion resistance and water resistance without containing a chromium compound and being excellent in powdering resistance, scratch resistance, sticking resistance, TIG weldability, punchability and coating appearance.

7 Claims, 1 Drawing Sheet

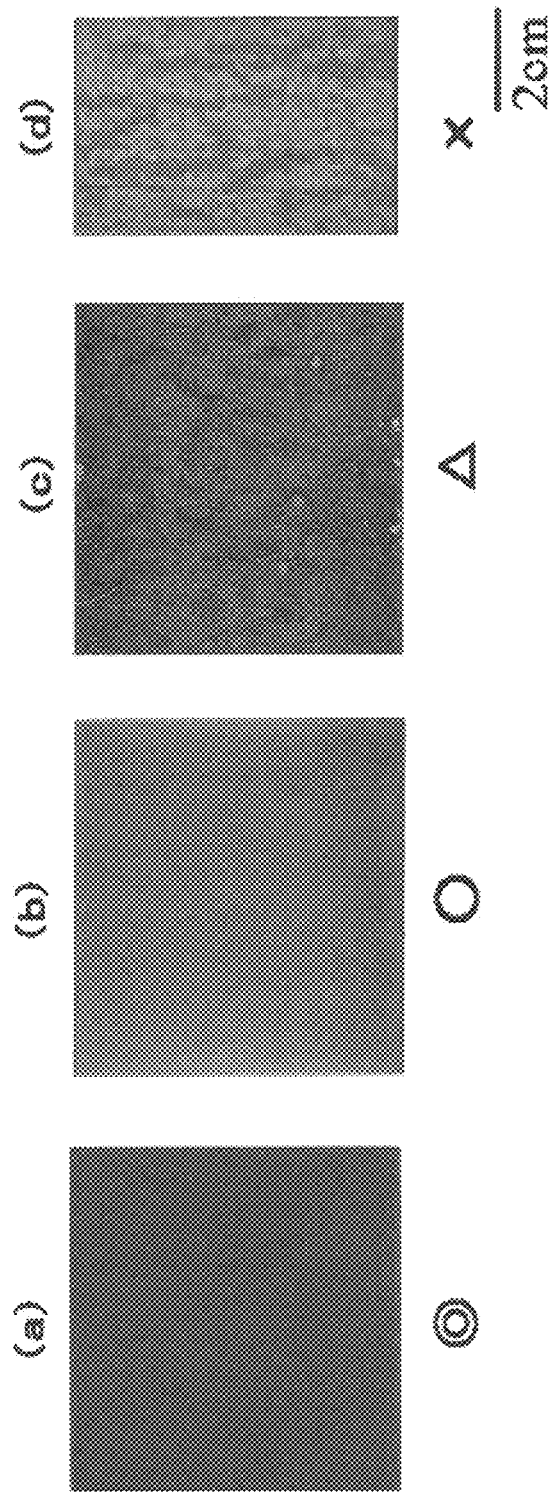

MAGNETIC STEEL SHEET WITH SEMI-ORGANIC INSULATION COATING

RELATED APPLICATIONS

This is a §371 of International Application No. PCT/JP2011/004123, with an international filing date of Jul. 21, 2011 (WO 2012/011286 A1, published Jan. 26, 2012), which is based on Japanese Patent Application No. 2010-165380, filed Jul. 22, 2010, the subject matter of which is incorporated herein by reference.

TECHNICAL FIELD

This disclosure relates to a magnetic steel sheet with a semi-organic insulation coating which has no deterioration of corrosion resistance and water resistance without containing a chromium compound and is excellent in powdering resistance, scratch resistance, sticking resistance, TIG weldability, punchability, and uniformity of coating appearance after annealing.

BACKGROUND

An insulation coating of a magnetic steel sheet used for motors, transformers and the like is required to have various properties such as not only interlaminar resistance, but also convenience in working, storage, stability in use and so on. Since the magnetic steel sheet is used in a variety of applications, it is attempted to develop various insulation coatings depending upon the application. When the magnetic steel sheet is subjected to punching, shearing, bending or the like, magnetic properties are deteriorated due to residual strain so that stress relief annealing at a temperature of about 700 to 800° C. is frequently conducted to solve this problem. In that case, therefore, the insulation coating must be resistant to the stress relief annealing.

The insulation coatings are roughly classified into three types:
(1) an inorganic coating placing great importance on weldability and heat resistance, and being resistant to stress relief annealing;
(2) a resin-containing inorganic coating aiming to establish punchability and weldability, and being resistant to stress relief annealing (i.e., semi-organic coating); and
(3) an organic coating that is unable to be subjected to stress relief annealing in a special application, but the coatings containing an inorganic component as shown in the above items (1) and (2) are resistant to the stress relief annealing as a general-purpose product, and they contain a chromium compound.

Particularly, chromate-based insulation coating of type (2) can dramatically improve the punchability in a 1-coat and 1-bake production as compared to the inorganic insulation coating and are widely used.

For example, in JP-B-S60-36476 is disclosed a magnetic steel sheet having an electrical insulation coating obtained by applying a treating solution formed by compounding a dichromate-based aqueous solution containing at least one divalent metal with 5-120 parts by weight as a solid content of a resin emulsion having a ratio of vinyl acetate/VeoVA as an organic resin of 90/10 to 40/60 and 10-60 parts by weight of an organic reducing agent based on 100 parts by weight of $CrO_3$ in the aqueous solution, onto a surface of a base iron sheet and then subjecting to baking according to the usual manner.

However, environmental awareness is rising in recent years. Hence, products having an insulation coating free of chromium compound are demanded by consumers even in the field of magnetic steel sheets.

There are developed magnetic steel sheets with an insulation coating containing no chromium compound. For example, as an insulation coating containing no chromium, but having a good punchability are described ones containing a resin and colloidal silica (alumina-containing silica) in JP-A-H10-130858. Also, an insulation coating comprising one or more of colloidal silica, alumina sol and zirconia sol and containing a water soluble or emulsion resin is described in JP-A-H10-46350, and an insulation coating composed mainly of a phosphate containing no chromium and containing a resin is described in Japanese Patent No. 2944849.

However, these magnetic steel sheets with the insulation coatings containing no chromium have problems that the bond between inorganic substances is relatively weak and the corrosion resistance is poor as compared to those containing a chromium compound. Also, when back tension is applied by rubbing the steel sheet surface with a felt in slit working (by using a tension pad), the occurrence of powdering comes into question. Furthermore, there is a problem that the coating becomes weaker after stress relief annealing and is easily scratched.

For instance, the above problems can not be solved by simply using one or more of colloidal silica, alumina sol and zirconia sol in the method of JP '350. Also, sufficient investigations are not made with respect to the case of mixing these components in combination and at a specific ratio. Furthermore, in the case of a phosphate coating with a composition containing no chromium as described in JP '849, sticking occurs and the water resistance tends to be deteriorated.

These problems are apt to be easily caused during baking at a relatively low temperature of not higher than 300° C., and the occurrence becomes particularly remarkable at a temperature of not higher than 200° C. Meanwhile, the baking temperature should be as low as possible from a viewpoint of the reduction of energy consumption and production cost, and so on.

In addition, when using the methods described in JP-A-2007-197820 and JP-A-2007-197824, i.e., when using a coating comprising a polysiloxane polymer obtained by copolymerizing polysiloxane with various organic resins and an inorganic compound such as silica, silicate or the like, there are problems that blowholes occur in the TIG welding, and that a spotted pattern occurs after annealing depending on the kind of the steel.

We discovered that, by compositely including a Zr compound and an Si compound containing a plate-like silica, or further a B compound as an inorganic component in the semi-organic coating, a number of the issues raised above can be addressed.

We thus provide:
1. A magnetic steel sheet provided on its surface with a semi-organic insulation coating comprising an inorganic component and an organic resin, characterized in that the inorganic component of the coating comprises a Zr compound and an Si compound containing a plate-like silica as a ratio in a dry coating of 20-70 mass % of Zr compound (converted to $ZrO_2$) and 10-50 mass % of Si compound containing a plate-like silica (converted to $SiO_2$), and the remainder of the coating is the organic resin.

2. The magnetic steel sheet with a semi-organic insulation coating according to the item 1, wherein the plate-like silica has an average particle size of 10 to 600 nm.
3. The magnetic steel sheet with a semi-organic insulation coating according to the item 1 or 2, wherein the plate-like silica has an aspect ratio (average length/average thickness ratio) of 2 to 400.
4. The magnetic steel sheet with a semi-organic insulation coating according to any one of the items 1 to 3, wherein the inorganic component further contains a B compound as a ratio in a dry coating of 0.1-5 mass % of B compound (converted at $B_2O_3$).
5. The magnetic steel sheet with a semi-organic insulation coating according to any one of the items 1 to 4, wherein the coating further contains not more than 30 mass % in total of one or more selected from a nitric acid compound (converted to $NO_3$), a silane coupling agent (converted to a solid content) and a phosphorus compound (converted to $P_2O_5$) as a ratio in a dry coating.

In other words, we provide a magnetic steel sheet having on its surface a semi-organic insulation coating comprising an inorganic component and an organic resin, wherein as the inorganic component is included (1) a Zr compound and an Si compound containing a plate-like silica as a ratio in a dry coating of 20-70 mass % of Zr compound (converted to $ZrO_2$) and 10-50 mass % of Si compound containing plate-like silica (converted to $SiO_2$);

(2) if necessary, a B compound as a ratio in a dry coating of 0.1-5 mass % of B compound (converted to $B_2O_3$); and (3) if necessary, not more than 30 mass % in total of one or more selected from a nitric acid compound (converted to $NO_3$), a silane coupling agent (converted to a solid content) and a phosphorus compound (converted to $P_2O_5$) as a ratio in a dry coating, the remainder of the coating is substantially the organic resin (i.e., with an allowance of containing impurities and known additives), and moreover, preferably, the average particle size of the plate-like silica is 10 to 600 nm and/or the aspect ratio (average length/average thickness ratio) of the plate-like silica is 2 to 400.

Our magnetic steel sheets with a semi-organic insulation coating are excellent in various properties such as powdering resistance, scratch resistance, sticking resistance, TIG weldability and punchability, and has no deterioration of water resistance and corrosion resistance without containing a chromium compound, and also are excellent in the uniformity of coating appearance after annealing.

BRIEF DESCRIPTION OF THE DRAWING

FIG. 1 is photographs showing coating appearance after stress relief annealing in comparison.

DETAILED DESCRIPTION

First, the reasons why the compounding ratio of the Zr compound and Si compound containing plate-like silica, and further B compound as the inorganic component of the semi-organic coating is limited to the above range will be described. Moreover, it should be noted that mass % of these components is the ratio in a dry coating.

Zr Compound: 20 to 70 Mass % as Converted to $ZrO_2$

The Zr compound has a strong bonding force to oxygen and can be strongly bonded to an oxide, a hydroxide and the like on the Fe surface. Also, since the Zr compound has three or more chemical bonds, a strong coating can be formed by forming a network between mutual Zrs or between Zr and other inorganic compound without using chromium. However, when the ratio of the Zr compound in the dry coating is less than 20 mass % as converted to $ZrO_2$, not only the adhesion property, corrosion resistance and powdering resistance are deteriorated, but also the deterioration of appearance after annealing due to an Si compound occurs. On the other hand, when it exceeds 70 mass %, the corrosion resistance and powdering resistance are deteriorated, and also the scratch resistance on the surface of the sheet after the stress relief annealing is deteriorated. Therefore, the amount of the Zr compound is 20 to 70 mass % as converted to $ZrO_2$.

As such, a Zr compound are mentioned, for example, zirconium acetate, zirconium propionate, zirconium oxychloride, zirconium nitrate, zirconium ammonium carbonate, zirconium potassium carbonate, zirconium hydroxychloride, zirconium sulfate, zirconium phosphate, zirconium sodium phosphate, zirconium potassium hexafluoride, tetra-n-propoxy-zirconium, tetra-n-butoxy-zirconium, zirconium tetra-acetylacetonate, zirconium tributoxy acetylacetonate, zirconium tributoxy stearate, and so on. They may be used alone or in a combination of two or more.

Si Compound Containing Plate-Like Silica: 10 to 50 Mass % as Converted to $SiO_2$ The plate-like silica is also called "leaf-like" silica or "scale-like" silica, has a layered silicate structure formed by laminating many $SiO_2$ thin layers, and is mostly non-crystalline or microcrystalline. Such a plate-like silica is excellent in inhibitive performance of permeating corrosive substance due to the layered form, excellent in adhesion property due to the presence of many hydroxyl groups, and excellent in slidability due to flexibility as compared to a commonly-used silica particle, for example, colloidal silica or the like. Therefore, it is more effective in the improvement of corrosion resistance and punchability.

The plate-like silica can be obtained by preparing agglomerated particles of laminated primary particles of the thin layers, and pulverizing these agglomerated particles.

The average particle size of the plate-like silica is preferably about 10 to 600 nm. More preferably, it is 100 to 450 nm. In addition, the aspect ratio (length/thickness ratio) of the plate-like silica is preferably about 2 to 400. More preferably, it is 10 to 100.

Moreover, since the plate-like silica tends to be laminated by orienting parallel to the surface of the steel sheet, the length (length in the longitudinal direction) of the plate-like silica can be determined by observing the surface of the coating with SEM (Scanning Electron Microscope). Also, the thickness of the plate-like silica can be determined by observing the cross section of frozen fracture, FIB (focused ion beam) or the like with SEM. Therefore, the length and the thickness of the plate-like silica are measured at several places by SEM observation, and the aspect ratio (average length/average thickness ratio) is determined from an average of these measured values.

Moreover, when silica is oval or polygonal, the average particle size in the sheet plane and the average thickness in the cross section are similarly measured at several places by SEM observation, and the aspect ratio is determined by (average particle size)/(average thickness).

As the Si compounds other than the plate-like silica may be mentioned colloidal silica, fumed silica, alkoxysilane, siloxane and the like. They contribute to the improvement of corrosion resistance, and adhesion property after stress relief annealing. Generally, colloidal silica and fumed silica are spherical or an ellipsoidal body with an aspect ratio of less than 2, while alkoxysilane and siloxane are amorphous.

When the compounding ratio of the plate-like silica in the whole of the Si compound is less than 50 mass %, good corrosion resistance and punchability cannot be obtained so that the compounding ratio of the plate-like silica is preferably not less than 50 mass %. Of course, all of the Si compounds may be plate-like silica. A particularly preferable range is 50 to 100 mass %.

Moreover, the compounding ratio of the plate-like silica can be determined, for example, by measuring $SiO_2$ amount (B) in the plate-like silica region and $SiO_2$ amount (A) in the other regions at the FIB cross section and calculating $B/(A+B) \times 100$. Furthermore, the $SiO_2$ amount in each region can be determined from the average Si concentration and the area of the region measured by EDS (Energy Dispersion Spectroscopy) and the like.

The aforementioned Si compound containing the plate-like silica is useful in solving the problems caused when the Zr compound is added alone. More specifically, although the use of the Zr compound alone tends to deteriorate the corrosion resistance and powdering resistance and considerably deteriorate the scratch resistance on a stress relief annealed steel sheet, powdering resistance and scratch resistance can be largely improved by compounding a proper amount of the Si compound.

When the amount of the Si compound included in the dry coating is less than 10 mass % as converted to $SiO_2$, sufficient corrosion resistance cannot be obtained, while when it exceeds 50 mass %, the powdering resistance is deteriorated, and also the scratch resistance on the stress relief annealed steel sheet is deteriorated, so that the amount of the Si compound is 10 to 50 mass %.

A B compound may be further included as the inorganic component in addition to the aforementioned Zr compound and the Si compound containing the plate-like silica.

B Compound: 0.1 to 5 Mass % as Converted to $B_2O_3$

The B compound advantageously contributes to solve the problems caused when the Zr compound is added alone. That is, when the Zr compound is added alone, a tendency of deteriorating the corrosion resistance and powdering resistance and considerably deteriorating the scratch resistance on the stress relief annealed steel sheet is seen. The reason is assumed due to the fact that when the Zr compound is used alone, the volume constriction is large in the baking and hence coating cracking easily occurs, and a place of exposing the substrate is partially caused.

In contrast, when a proper amount of the B compound is compounded to the Zr compound, the coating cracking caused in the case of using the Zr compound alone can be effectively mitigated to considerably improve the powdering resistance.

When the ratio of the B compound in the dry coating is not less than 0.1 mass % as converted to $B_2O_3$, the addition effect is exerted, while when it is not more than 5 mass %, unreacted substances do not remain in the coating, and adhesive between the coatings (i.e., a defect of fusing the coatings to each other) after stress relief annealing (sticking) does not occur, so that the amount of the B compound is preferably 0.1 to 5 mass % as converted to $B_2O_3$.

As the B compounds are mentioned boric acid, orthoboric acid, metaboric acid, tetraboric acid, sodium metaborate, sodium tetraborate and the like. They may be used alone or in a combination of two or more. However, it is not limited to them, and may include, for example, a compound dissolving in water to generate a boric ion, and also the boric ion may be polymerized in a linear or a cyclic state.

In addition to the aforementioned inorganic components, one or more selected from a nitric acid compound, a silane coupling agent and a phosphorous compound described below can be further included in the dry coating at a ratio of not more than 30 mass % in total. Moreover, the ratios of the nitric acid compound, silane coupling agent and phosphorous compound in the dry coating are represented by a value converted to $NO_3$ (nitric acid compound), a value converted to a solid content (silane coupling agent) and a value converted to $P_2O_5$ (phosphorous compound), respectively.

The nitric acid compound, silane coupling agent and phosphorous compound effectively contribute to the improvement of corrosion resistance. When the ratio in the dry coating is not more than 30 mass % in total, unreacted substances do not remain in the coating and the water resistance is not deteriorated, so that the content is preferable to be not more than 30 mass % in total. To sufficiently develop the effect of these components, it is preferable to include these components at a ratio of not less than 1 mass % in the dry coating.

Nitric acid-based or nitrous acid-based compounds and further hydrates thereof as shown below are advantageously suitable as the nitric acid compound.

Nitric Acid-Based:
nitric acid ($HNO_3$), potassium nitrate ($KNO_3$), sodium nitrate ($NaNO_3$), ammonium nitrate ($NH_4NO_3$), calcium nitrate ($Ca(NO_3)_2$), silver nitrate ($AgNO_3$), iron (II) nitrate ($Fe(NO_3)_2$), iron (III) nitrate ($Fe(NO_3)_3$), copper (II) nitrate ($Cu(NO_3)_2$), barium nitrate ($Ba(NO_3)_2$), aluminum nitrate ($Al(NO_3)_3$), magnesium nitrate ($Mg(NO_3)_2$), zinc nitrate ($Zn(NO_3)_2$), nickel (II) nitrate ($Ni(NO_3)_2$), zirconium nitrate ($ZrO(NO_3)_2$).

Nitrous Acid-Based:
nitrous acid ($HNO_2$), potassium nitrite, calcium nitrite, silver nitrite, sodium nitrite, barium nitrite, ethyl nitrite, isoamyl nitrite, isobutyl nitrite, isopropyl nitrite, t-butyl nitrite, n-butyl nitrite, n-propyl nitrite.

As the silane coupling agent are advantageously suitable those shown below.

Vinyl-Based:
vinyl trichlorosilane, vinyl trimethoxysilane, vinyl triethoxysilane.

Epoxy-Based:
2-(3,4-epoxycyclohexyl)ethyl trimethoxysilane, 3-glycidoxypropyl trimethoxysilane, 3-glycidoxypropylmethyl diethoxysilane, 3-glycidoxypropyl triethoxysilane.

Styryl-Based:
p-styryl trimethoxysilane.

Methacryloxy-Based:
3-methacryloxy propylmethyl dimethoxysilane, 3-methacryloxy propyl trimethoxysilane, 3-methacryloxy propylmethyl diethoxysilane, 3-methacryloxy propyl triethoxysilane.

Acryloxy-Based:
3-acryloxy propyl trimethoxysilane.

Amino-Based:
N-2-(aminoethyl)-3-aminopropylmethyl dimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-triethoxysilyl-N-(1,3-dimethyl-butylidene)propylamine and a partial hydrolyzate thereof, N-phenyl-3-aminopropyl trimethoxysilane, hydrochloride of N-(vinylbenzyl)-2-aminoethyl-3-aminopropyl trimethoxysilane, special aminosilanes.

Ureido-Based:

3-ureidopropyl triethoxysilane.

Chloropropyl-Based:

3-chloropropyl trimethoxysilane.

Mercapto-Based:

3-mercaptopropylmethyl dimethoxysilane, 3-mercaptopropyl trimethoxysilane.

Polysulfide-Based:

bis(triethoxysilylpropyl)tetrasulfide.

Isocyanate-Based:

3-isocyanatepropyl triethoxysilane.

Furthermore, phosphoric acid and phosphates as shown below are advantageously suitable as the phosphorous compound.

Phosphoric Acid:

orthophosphoric acid, phosphoric acid anhydride, linear polyphosphoric acid, cyclic metaphosphoric acid.

Phosphate:

Magnesium phosphate, aluminum phosphate, calcium phosphate, zinc phosphate.

Hf, $HfO_2$, $TiO_2$, $Fe_2O_3$ and so on may be incorporated into the inorganic component as an impurity. However, a problem does not particularly occurs when the total amount of these impurities is not more than 1 mass % in the dry coating.

It is preferable that the organic resin is compounded at a ratio of 5 to 40 mass % to render the content of the inorganic component as mentioned above in the dry coating into 60 to 95 mass %.

The organic resin is not particularly limited and any of known ones conventionally used are advantageously suitable. The organic resin includes, for example, aqueous resins (emulsion, dispersion, water soluble) of acryl resin, alkyd resin, polyolefin resin, styrene resin, vinyl acetate resin, epoxy resin, phenol resin, polyester resin, urethane resin, melamine resin and so on. Emulsions of acryl resin and ethylene acrylate resin are particularly preferable.

The organic resins effectively contribute to the improvement of the corrosion resistance, scratch resistance and punchability. When the compounding ratio in the dry coating is not less than 5 mass %, the addition effect is large, while when it is not more than 40 mass %, the scratch resistance after stress relief annealing and TIG weldability are not deteriorated, so that the compounding ratio of the organic resin is preferably about 5 to 40 mass % as converted to a solid content.

It should be noted that the ratio in the dry coating refers to a ratio of each component in a coating formed on a surface of a steel sheet by applying a treating solution containing the aforementioned components onto the steel sheet, and drying by baking. It can also be determined from residual components (solid content) after drying the treating solution at 180° C. for 30 minutes.

Furthermore, it is possible to include additives usually used and other inorganic or organic compounds in addition to the aforementioned components.

The additive is added to further enhance performance and uniformity of the insulation coating, and includes a surfactant, an antirust agent, a lubricant, an antioxidant and the like. Moreover, the amount of the additive compounded in the dry coating is preferably not more than about 10 mass % from a viewpoint of the maintaining of sufficient coating properties.

The magnetic steel sheet as a starting material is not particularly limited, and any known ones are suitable.

That is, any of so-called soft (magnetic) iron sheets (electric iron sheets) having a high magnetic flux density, common cold-rolled steel sheets such as SPPC and the like, non-oriented magnetic steel sheets containing Si and/or Al for increasing specific electrical resistance and so on are advantageously suitable for reducing iron loss. Particularly, it is preferable to use a steel sheet containing about 0.1 to 10 mass % of Si or (Si+Al) and/or a steel sheet having an iron loss $W_{15/50}$ of not more than about 7 W/kg.

Next, the method for forming the insulation coating will be described.

A pretreatment of a magnetic steel sheet as a starting material is not particularly defined. More specifically, the steel sheet may be untreated, but it is advantageous to be subjected to a degreasing treatment with alkali or the like and a pickling treatment with hydrochloric acid, sulfuric acid, phosphoric acid or the like.

Then, to the surface of this magnetic steel sheet is applied a treating solution formed by compounding a Zr compound and an Si compound containing a plate-like silica, and optionally a B compound and optionally one or more selected from a nitric acid compound, a silane coupling agent and a phosphorous compound, and, if necessary, an additive and the like together with an organic resin at given ratios and then baked to form an insulation coating. As a method for coating the treating solution for insulation coatings are applicable various methods usually and industrially used such as roll coater, flow coater, spray, knife coater and so on. Also, as the baking method are possible a hot air type, an infrared type, an induction heating type and the like as generally conducted. The baking temperature may be a normal level, and may be about 150 to 350° C. as a maximum reaching temperature on the steel sheet.

The magnetic steel sheet with an insulation coating can remove strain due to punching, for example, by subjecting to stress relief annealing. As a preferable stress relief annealing atmosphere is applied an atmosphere hardly oxidizing iron such as $N_2$ atmosphere, DX gas atmosphere or the like. The corrosion resistance can be further improved by setting a dew point high, for example, Dp: about 5 to 60° C. to slightly oxidize the surface and cut end surface. Also, the stress relief annealing temperature is preferably 700 to 900° C., more preferably 700 to 800° C. The holding time of the stress relief annealing temperature is preferably longer, and more preferably not shorter than 2 hours.

The amount of the insulation coating adhered is not particularly limited, but is preferably about 0.05 to 5 g/m² per side. The coating amount or the total solid content mass of the insulation coating can be measured from weight reduction after the removal of the coating through dissolving with alkali. If the coating amount is small, it can be determined by using a standard sample having a known coating amount and measuring a relationship between a detection intensity of Zr or Si by a fluorescent X-ray analysis and the coating amount per coating composition and converting the fluorescent X-ray analyzed intensity of Zr or Si into a coating amount depending upon the coating composition based on this calibration curve. When the coating amount is not less than 0.05 g/m², the insulation property can be satisfied with the corrosion resistance, while when it is not more than 5 g/m², not only the adhesion property is improved, but also blistering is not caused in the coat baking, and the deterioration of coatability is not incurred. More preferably, it is 0.1 to 3.0 g/m². Although it is preferable to form insulation coatings on the both sides of the steel sheet, the coating may be formed on only one side depending on the purpose. In addition, the coating is formed on only one side and another insulation coating may be formed on the other side depending on the purpose.

EXAMPLES

Although the effect of our steel sheets will be concretely described based on examples below, this disclosure is not limited to these examples.

Example 1

A treating solution is prepared by adding a Zr compound and an Si compound containing a plate-like silica and further a nitric acid compound, a silane coupling agent, a phosphorus compound and an additive to a deionized water together with an organic resin so that components of an insulation coating after drying are shown in Tables 1-1 and 1-2. Moreover, the addition concentration to the deionized water is 50 g/l.

Each of these treating solutions is applied to a surface of a test piece with a size of 150 mm in width and 300 mm in length cut out from a magnetic steel sheet [A230 (JIS C 2552 (2000))] of 0.5 mm in thickness by a roll coater, baked in a hot air baking oven at a baking temperature (temperature arriving in steel sheet) shown in Tables 1-1 and 1-2, and then allowed to cool to room temperature to form insulation coatings on the both sides.

The results examined on the corrosion resistance and powdering resistance of the thus obtained magnetic steel sheets with semi-insulation coatings are shown in Table 2.

Further, the scratch resistance after the steel sheets are subjected to stress relief annealing in a nitrogen atmosphere at 750° C. for 2 hours, the scratch resistance, sticking resistance, TIG weldability, punchability, water resistance, and appearance after stress relief annealing are examined to obtain results also shown in Table 2.

Moreover, types of the Zr compound are shown in Table 3, types of the Si compound are shown in Table 4, types of the phosphorous compound and nitric acid compound are shown in Table 5, types of the silane coupling agent are shown in Table 6, and types of the organic resin are shown in Table 7.

Also, the evaluation method for each property is as follows.

<Corrosion Resistance>

The humidity cabinet test (50° C., relative humidity >98%) is conducted to the test piece, and a rate of developing red rust after 48 hours is visually observed and evaluated as an area ratio.

(Criteria)

| ☆: red rust area ratio | less than 5% |
|---|---|
| ⊚: red rust area ratio | not less than 5% but less than 15% |
| ○: red rust area ratio | not less than 15% but less than 40% |
| Δ: red rust area ratio | not less than 40% but less than 60% |
| X: red rust area ratio | not less than 60% |

<Powdering Resistance>

Test conditions; Felt contact face width: 20 mm×10 mm, load: 0.4 MPa (3.8 kg/cm$^2$), 100 times of simple reciprocation on a coating surface. Scratch marks after the test are visually observed to evaluate an exfoliated state and a powdered state of the coating.

(Criteria)

| ☆: coating residual ratio | any scratch mark is hardly observed |
|---|---|
| ○: coating residual ratio | slight scratch marks and slight powdering are observed |
| Δ: coating residual ratio | abrasion of the coating progresses, and scratch marks and powdering are clearly observed |
| X: coating residual ratio | reach to expose an iron substrate, and powdering dust is severe |

<Scratch Resistance After Annealing>

The surface of the sample annealed under test condition of holding in an N$_2$ atmosphere at 750° C. for 2 hours is scratched by a steel sheet shear edge to judge the degrees of scratch and powdering.

(Criteria)

⊚: any occurrence of scratch and powdering is hardly observed

○: slight scratch marks and slight powdering are observed

Δ: scratch marks and powdering are clearly observed x: reach to expose an iron substrate, and scratch dust is severe <Sticking Resistance>

10 test sample sheets with 50 mm square are stacked and annealed in a nitrogen atmosphere at 750° C. for 2 hours while applying a load: 20 kPa (200 g/cm$^2$). Then, 500 g of weight is dropped on the test samples (steel sheets) to measure a drop height when the test sample sheets are divided into five pieces.

(Criteria)

⊚: not more than 10 cm

○: more than 10 cm but not more than 15 cm

Δ: more than 15 cm but not more than 30 cm x: more than 30 cm

<TIG Weldability>

The test samples are laminated under a pressure of 9.8 MPa (100 kgf/cm$^2$) so as to have a thickness of 30 mm, and an end face portion thereof (length 30 mm) is subjected to TIG welding under the following conditions:

welding current: 120 A

Ar gas flow rate: 6 liter/min welding speed: 10, 20, 30, 40, 50, 60, 70, 80, 90, 100 cm/min (Criteria)

Relative merits are judged by the welding speed satisfying the number of blowholes of not more than 5 per bead.

⊚: not less than 60 cm/min

○: not less than 40 cm/min but less than 60 cm/min

Δ: not less than 20 cm/min but less than 40 cm/min x: less than 20 cm/min

<Punchability>

The test sample is subjected to punching with a 15 mm φ steel dice until a burr height reaches to 50 μm, and the evaluation is represented by the number of punchings.

(Criteria)

⊚: not less than 1,200,000 times

○: not less than 500,000 times but less than 1,200,000 times

Δ: not less than 100,000 times but less than 500,000 times x: less than 100,000 times <Water Resistance>

The test sample is exposed in a steam above a boiling water for 30 minutes to observe an appearance change.

(Criteria)

⊚: no change

○: slight change of color is visually observed

Δ: clear change of color is visually observed

Δ: coating dissolved

<Appearance after Stress Relief Annealing>

An appearance of a steel sheet is visually observed by holding the test sample in an $N_2$ atmosphere at 750° C. for 2 hours and then cooling to room temperature.

(Criteria)

⊚: appearance after annealing is completely uniform as shown in FIG. 1(a)

○: unevenness in appearance after annealing as shown in FIG. 1(b)

Δ: spotted pattern in appearance after annealing as shown in FIG. 1(c)

x: remarkable spotted pattern in appearance after annealing as shown in FIG. 1(d)

TABLE 1-1

| | Components of insulation coating | | | | | | | |
|---|---|---|---|---|---|---|---|---|
| | Inorganic component | | | | Arbitrary addition component | | | |
| | Zr Compound | | Si compound | | Phosphorus compound | | Nitric acid compound | |
| No. | Type in Table 3 | Addition amount (converted to $ZrO_2$) (mass %) | Type* in Table 4 | Addition amount (converted to $SiO_2$) (mass %) | Type in Table 5 | Addition amount (converted to $P_2O_5$%) (mass %) | Type in Table 5 | Addition amount (converted to $NO_3$) (mass %) |
| 1 | Z1 | 60 | S2 (100) | 22 | — | 0 | — | 0 |
| 2 | Z1 | 50 | S2 (80) | 22 | — | 0 | — | 0 |
| 3 | Z1 | 70 | S2 (100) | 12 | — | 0 | — | 0 |
| 4 | Z1 | 55 | S2 (50) | 15 | — | 0 | — | 0 |
| 5 | Z1 | 57 | S2 (70) | 35 | — | 0 | — | 0 |
| 6 | Z2 | 50 | S2 (80) | 32 | — | 0 | — | 0 |
| 7 | Z3 | 50 | S2 (50) | 32 | — | 0 | — | 0 |
| 8 | Z4 | 50 | S2 (40) | 32 | — | 0 | — | 0 |
| 9 | Z5 | 50 | S2 (30) | 32 | — | 0 | — | 0 |
| 10 | Z6 | 50 | S2 (20) | 32 | — | 0 | — | 0 |
| 11 | Z1 | 50 | S1 (100) | 32 | — | 0 | — | 0 |
| 12 | Z1 | 50 | S3 (80) | 32 | — | 0 | — | 0 |
| 13 | Z1 | 50 | S4 (80) | 32 | — | 0 | — | 0 |
| 14 | Z1 | 40 | S2 (100) | 22 | P1 | 30 | — | 0 |
| 15 | Z1 | 40 | S2 (50) | 22 | P2 | 30 | — | 0 |
| 16 | Z1 | 40 | S2 (100) | 22 | — | 0 | N1 | 30 |
| 17 | Z1 | 40 | S2 (50) | 22 | — | 0 | N1 | 30 |
| 18 | Z1 | 40 | S2 (80) | 22 | — | 0 | — | 0 |

| | Components of insulation coating | | | | | |
|---|---|---|---|---|---|---|
| | Arbitrary addition component Silane coupling agent | | Organic resin | | Coating | |
| No. | Type in Table 6 | Addition amount (converted to solid content) (mass %) | type in Table 7 | Compounding amount in dry coating (mass %) | Baking temperature (° C.) | amount of insulation coating (g/m²) | Remarks |
| 1 | — | 0 | R1 | 18 | 250 | 0.5 | Example 1 |
| 2 | — | 0 | R1 | 28 | 250 | 0.3 | Example 2 |
| 3 | — | 0 | R1 | 18 | 250 | 0.4 | Example 3 |
| 4 | — | 0 | R1 | 38 | 250 | 0.5 | Example 4 |
| 5 | — | 0 | R1 | 8 | 250 | 0.5 | Example 5 |
| 6 | — | 0 | R1 | 18 | 250 | 0.5 | Example 6 |
| 7 | — | 0 | R1 | 18 | 250 | 0.5 | Example 7 |
| 8 | — | 0 | R1 | 18 | 250 | 0.5 | Example 8 |
| 9 | — | 0 | R1 | 18 | 250 | 0.5 | Example 9 |
| 10 | — | 0 | R1 | 18 | 250 | 0.5 | Example 10 |
| 11 | — | 0 | R1 | 18 | 250 | 0.5 | Example 11 |
| 12 | — | 0 | R1 | 18 | 250 | 0.5 | Example 12 |
| 13 | — | 0 | R1 | 18 | 250 | 0.5 | Example 13 |
| 14 | — | 0 | R1 | 8 | 250 | 0.5 | Example 14 |
| 15 | — | 0 | R1 | 8 | 250 | 0.5 | Example 15 |
| 16 | — | 0 | R1 | 8 | 250 | 0.5 | Example 16 |
| 17 | — | 0 | R1 | 8 | 250 | 0.5 | Example 17 |
| 18 | C11 | 30 | R1 | 8 | 250 | 0.5 | Example 18 |

*Inside ( ) shows the ratio (mass %) of plate-like silica in Si compound. The remainder is S0 (colloidal silica).

TABLE 1-2

| | Components of insulation coating ||||||||
|---|---|---|---|---|---|---|---|---|
| | Inorganic component |||| Arbitrary addition component ||||
| | Zr Compound || Si compound || Phosphorus compound || Nitric acid compound ||
| No. | Type in Table 3 | Addition amount (converted to $ZrO_2$) (mass %) | Type* in Table 4 | Addition amount (converted to $SiO_2$) (mass %) | Type in Table 5 | Addition amount (converted to $P_2O_5$) (mass %) | Type in Table 5 | Addition amount (converted to $NO_3$) (mass %) |
| 19 | Z1 | 40 | S2 (80) | 22 | — | 0 | — | 0 |
| 20 | Z1 | 40 | S2 (80) | 22 | — | 0 | — | 0 |
| 21 | Z1 | 50 | S2 (100) | 32 | — | 0 | — | 0 |
| 22 | Z1 | 50 | S2 (100) | 32 | — | 0 | — | 0 |
| 23 | Z1 | 50 | S2 (80) | 32 | — | 0 | — | 0 |
| 24 | Z1 | 50 | S2 (80) | 32 | — | 0 | — | 0 |
| 25 | Z1 | 50 | S2 (80) | 32 | — | 0 | — | 0 |
| 26 | Z1 | 10 | S2 (80) | 32 | — | 0 | — | 0 |
| 27 | Z1 | 80 | S2 (80) | 12 | — | 0 | — | 0 |
| 28 | Z1 | 50 | S2 (80) | 5 | — | 0 | — | 0 |
| 29 | Z1 | 32 | S2 (80) | 60 | — | 0 | — | 0 |
| 30 | Z1 | 30 | S2 (100) | 12 | P1 | 50 | — | 0 |
| 31 | Z1 | 30 | S2 (50) | 12 | P2 | 50 | — | 0 |
| 32 | Z1 | 30 | S2 (100) | 12 | — | 0 | N1 | 50 |
| 33 | Z1 | 30 | S2 (50) | 12 | — | 0 | N2 | 50 |
| 34 | Z1 | 30 | S2 (100) | 12 | — | 0 | — | 0 |
| 35 | Z1 | 30 | S2 (100) | 12 | — | 0 | — | 0 |
| 36 | Z1 | 30 | S2 (100) | 12 | — | 0 | — | 0 |
| 37 | Z1 | 50 | only SO | 42 | — | 0 | — | 0) |

| | Components of insulation coating |||||||
|---|---|---|---|---|---|---|---|
| | Arbitrary addition component Silane coupling agent || Organic resin || | | |
| No. | Type in Table 6 | Addition amount (converted to solid content) (mass %) | Type in Table 7 | Compounding amount in dry coating (mass %) | Baking temperature (° C.) | Coating amount of insulation coating (g/m²) | Remarks |
| 19 | C12 | 30 | R1 | 8 | 250 | 0.5 | Example 19 |
| 20 | C13 | 30 | R1 | 8 | 250 | 0.5 | Example 20 |
| 21 | — | 0 | R1 | 18 | 250 | 0.03 | Example 21 |
| 22 | — | 0 | R1 | 18 | 250 | 5 | Example 22 |
| 23 | — | 0 | R2 | 18 | 250 | 0.5 | Example 23 |
| 24 | — | 0 | R3 | 18 | 250 | 0.5 | Example 24 |
| 25 | — | 0 | R4 | 18 | 250 | 0.5 | Example 25 |
| 26 | — | 0 | R1 | 58 | 250 | 0.3 | Comparative Example 1 |
| 27 | — | 0 | R1 | 8 | 250 | 0.4 | Comparative Example 2 |
| 28 | — | 0 | R1 | 45 | 250 | 0.5 | Comparative Example 3 |
| 29 | — | 0 | R1 | 8 | 250 | 0.5 | Comparative Example 4 |
| 30 | — | 0 | R1 | 8 | 250 | 0.5 | Comparative Example 5 |
| 31 | — | 0 | R1 | 8 | 250 | 0.5 | Comparative Example 6 |
| 32 | — | 0 | R1 | 8 | 250 | 0.5 | Comparative Example 7 |
| 33 | — | 0 | R1 | 8 | 250 | 0.5 | Comparative Example 8 |
| 34 | C11 | 50 | R1 | 8 | 250 | 0.5 | Comparative Example 9 |
| 35 | C12 | 50 | R1 | 8 | 250 | 0.5 | Comparative Example 10 |
| 36 | C13 | 50 | R1 | 8 | 250 | 0.5 | Comparative Example 11 |

TABLE 1-2-continued

| 37 | — | 0 | R1 | 8 | 250 | 0.5 | Comparative Example 12 |

*Inside ( ) shows a ratio (mass %) of plate-like silica in Si compound. The remainder is S0 (colloidal silica).

TABLE 2

| | Coating properties | | | | | | | | |
|---|---|---|---|---|---|---|---|---|---|
| No. | Corrosion resistance | Powdering resistance | Scratch resistance after annealing | Sticking resistance | TIG weldability | Punchability | Water resistance | Appearance after annealing | Remarks |
| 1 | ◎ | ○ | ◎ | ◎ | ◎ | ◎ | ◎ | ◎ | Example 1 |
| 2 | ◎ | ○ | ◎ | ◎ | ◎ | ◎ | ◎ | ◎ | Example 2 |
| 3 | ◎ | ○ | ◎ | ◎ | ◎ | ◎ | ◎ | ◎ | Example 3 |
| 4 | ◎ | ○ | ◎ | ◎ | ◎ | ◎ | ◎ | ◎ | Example 4 |
| 5 | ◎ | ○ | ◎ | ◎ | ◎ | ◎ | ◎ | ◎ | Example 5 |
| 6 | ◎ | ○ | ◎ | ◎ | ◎ | ◎ | ◎ | ◎ | Example 6 |
| 7 | ◎ | ○ | ◎ | ◎ | ◎ | ◎ | ◎ | ◎ | Example 7 |
| 8 | ○ | ○ | ◎ | ◎ | ◎ | ○ | ◎ | ◎ | Example 8 |
| 9 | ○ | ○ | ◎ | ◎ | ◎ | ○ | ◎ | ◎ | Example 9 |
| 10 | ○ | ○ | ◎ | ◎ | ◎ | ○ | ◎ | ◎ | Example 10 |
| 11 | ○ | ○ | ◎ | ◎ | ◎ | ○ | ◎ | ◎ | Example 11 |
| 12 | ○ | ○ | ◎ | ◎ | ◎ | ○ | ◎ | ◎ | Example 12 |
| 13 | ◎ | ○ | ◎ | ◎ | ◎ | ◎ | ◎ | ◎ | Example 13 |
| 14 | ☆ | ○ | ◎ | ◎ | ◎ | ◎ | ○ | ◎ | Example 14 |
| 15 | ☆ | ○ | ◎ | ◎ | ◎ | ◎ | ○ | ◎ | Example 15 |
| 16 | ☆ | ○ | ◎ | ◎ | ◎ | ◎ | ○ | ◎ | Example 16 |
| 17 | ☆ | ○ | ◎ | ◎ | ◎ | ◎ | ○ | ◎ | Example 17 |
| 18 | ☆ | ○ | ◎ | ◎ | ◎ | ◎ | ○ | ◎ | Example 18 |
| 19 | ☆ | ○ | ◎ | ◎ | ◎ | ◎ | ○ | ◎ | Example 19 |
| 20 | ☆ | ○ | ◎ | ◎ | ◎ | ◎ | ○ | ◎ | Example 20 |
| 21 | ○ | ○ | ○ | ◎ | ◎ | ○ | ○ | ◎ | Example 21 |
| 22 | ◎ | ○ | ○ | ◎ | ○ | ◎ | ◎ | ○ | Example 22 |
| 23 | ◎ | ○ | ◎ | ◎ | ◎ | ◎ | ◎ | ◎ | Example 23 |
| 24 | ◎ | ○ | ◎ | ◎ | ◎ | ◎ | ◎ | ◎ | Example 24 |
| 25 | ◎ | ○ | ◎ | ◎ | ◎ | ◎ | ◎ | ◎ | Example 25 |
| 26 | X | X | X | ◎ | X | ◎ | ◎ | X | Comparative Example 1 |
| 27 | X | X | X | ◎ | ◎ | ◎ | ◎ | ◎ | Comparative Example 2 |
| 28 | Δ | Δ | Δ | ◎ | Δ | ◎ | ◎ | ◎ | Comparative Example 3 |
| 29 | Δ | X | X | ◎ | ◎ | Δ | ◎ | ◎ | Comparative Example 4 |
| 30 | Δ | Δ | Δ | ◎ | ◎ | ◎ | Δ | ◎ | Comparative Example 5 |
| 31 | Δ | Δ | Δ | ◎ | ◎ | Δ | X | Δ | Comparative Example 6 |
| 32 | Δ | Δ | Δ | ◎ | ◎ | ◎ | X | ◎ | Comparative Example 7 |
| 33 | Δ | Δ | Δ | ◎ | ◎ | Δ | X | Δ | Comparative Example 8 |
| 34 | Δ | Δ | Δ | ◎ | ◎ | ◎ | X | ◎ | Comparative Example 9 |
| 35 | Δ | Δ | Δ | ◎ | ◎ | ◎ | X | ◎ | Comparative Example 10 |
| 36 | Δ | Δ | Δ | ◎ | ◎ | ◎ | X | ◎ | Comparative Example 11 |
| 37 | X | Δ | Δ | ○ | ◎ | X | X | X | Comparative Example 12 |

TABLE 3

| Symbol | Name | Chemical formula | Manufacturer | Trade name |
|---|---|---|---|---|
| Z1 | Ammonium zirconium carbonate | $(NH_4)_2[Zr(CO_3)_2(OH_2)]$ | Daiichi Kigenso Kagaku Co., Ltd. | Zircosol AC-20 |
| Z2 | Potassium zirconium carbonate | $K_2[Zr(CO_3)_2(OH_2)]$ | Nippon Light Metal Co., Ltd. | Zirmel 1000 |
| Z3 | Zirconium acetate | $(CH_3CO_2)_nZr$ | Daiichi Kigenso Kagaku Co., Ltd. | Zircosol ZA-20 |
| Z4 | Zirconium sulfate | $H_2Zr(OH)_2(SO_4)_2$ | Nippon Light Metal Co., Ltd. | — |
| Z5 | Zirconium nitrate | $ZrO(NO_3)_2$ | Nippon Light Metal Co., Ltd. | — |
| Z6 | Potassium zirconium hexafluoride | $K_2ZrF_6$ | Mitsubishi Materials Electronic Chemicals Co., Ltd. | — |

TABLE 4

| Symbol | Content |
|---|---|
| S0 | Colloidal silica with average particle size: 13 nm |
| S1 | Plate-like silica with average particle size: 50 nm, aspect ratio: 2 |
| S2 | Plate-like silica with average particle size: 200 nm, aspect ratio: 10 |
| S3 | Plate-like silica with average particle size: 600 nm, aspect ratio: 400 |
| S4 | Plate-like silica with average particle size: 300 nm, aspect ratio: 20 |

TABLE 5

| Symbol | Name | Chemical formula |
|---|---|---|
| P1 | Orthophosphoric acid | $H_3PO_4$ |
| P2 | Ammonium phosphate | $(NH_4)_3PO_4$ |
| N1 | Nickel nitrate | $Ni(NO_3)_2 \cdot 6H_2O$ |
| N2 | Zirconium nitrate | $ZrO(NO_3)_2$ |

TABLE 6

| Symbol | Name |
|---|---|
| CI1 | Vinyltrimethoxysilane |
| CI2 | 3-glycidoxypropyltrimethoxysilane |
| CI3 | N-2-(aminoethyl)-3-aminopropylmethyldimethoxysilane |

TABLE 7

| Symbol | Name | Manufacturer | Trade name |
|---|---|---|---|
| R1 | Epoxy resin | ADEKA Corporation | ADEKA RESIN EM |
| R2 | Polyester resin | TOYOBO Co., Ltd. | Vylonal MD1200 |
| R3 | Acryl resin | DIC Corporation | VONCOAT CP6140 |
| R4 | Urethane resin | ADEKA Corporation | ADEKA BONTIGHTER HUX |

As shown in Table 2, all of our magnetic steel sheets with a semi-organic insulation coating are excellent in not only the corrosion resistance and powdering resistance, but also scratch resistance after stress relief annealing, sticking resistance, TIG weldability, punchability and water resistance, and further excellent in the appearance after stress relief annealing.

On the other hand, Comparative Examples 1 and 2, wherein the amount of Zr compound is out of the adequate range, are particularly poor in the corrosion resistance, powdering resistance and scratch resistance after annealing. Comparative Example 1 is also poor in the TIG weldability and appearance after annealing.

Also, Comparative Example 3, wherein the amount of Si compound is less than the lower limit, is poor in the corrosion resistance, powdering resistance, scratch resistance after annealing and TIG weldability, while Comparative Example 4, wherein the amount of Si compound is more than the upper limit, is particularly poor in the powdering resistance and scratch resistance after annealing.

Furthermore, all of Comparative Examples 5 to 11 containing an amount of nitric acid compound or silane coupling agent or phosphorous compound exceeding over the adequate range are poor in the corrosion resistance, powdering resistance, scratch resistance after annealing and water resistance.

Moreover, Comparative Example 12 using only colloidal silica without plate-like silica as an Si compound is particularly poor in the corrosion resistance, punchability, water resistance and appearance after annealing, and is also not as good as our Examples in the powdering resistance and scratch resistance after annealing.

Example 2

A treating solution is prepared by adding a Zr compound, a B compound and a Si compound containing a plate-like silica, and further a nitric acid compound, a silane coupling agent, a phosphorous compound or an additive to a deionized water together with an organic resin so that components of an insulation coating after drying are shown in Tables 8-1 and 8-2. Moreover, the addition concentration to the deionized water is 50 g/l.

Each of these treating solutions is applied onto surfaces of a test piece with a size of 150 mm in width and 300 mm in length, which is cut out from a magnetic steel sheet [A230 (JIS C 2552 (2000))] of 0.5 mm in thickness, by a roll coater, baked in a hot air baking oven at a baking temperature (maximum reaching temperature on steel sheet) shown in Tables 8-1 and 8-2, and then allowed to cool to room temperature to form insulation coatings on the both sides.

The results examined on the corrosion resistance and powdering resistance of the thus obtained magnetic steel sheet with semi-insulation coatings are shown in Table 9.

Further, the scratch resistance the steel sheets are subjected to stress relief annealing in a nitrogen atmosphere at 750° C. for 2 hours, the scratch resistance, sticking resistance, TIG weldability, punchability, water resistance, and appearance after stress relief annealing are examined to obtain results also shown in Table 9.

Moreover, the type of the B compound is shown in Table 10.

Also, the evaluation method for each property is the same as Example 1.

TABLE 8-1

| | Components of insulation coating | | | | | | | | | | |
|---|---|---|---|---|---|---|---|---|---|---|---|
| | Inorganic component | | | | | | Arbitrary addition component | | | | |
| | Zr compound | | B compound | | Si compound | | Phosphorus compound | | Nitric acid compound | | |
| No. | Type in Table 3 | Addition amount (converted to $ZrO_2$) (mass %) | Type in Table 10 | Addition amount (converted to $B_2O_3$) (mass %) | Type* in Table 4 | Addition amount (converted to $SiO_2$) (mass %) | Type in Table 5 | Addition amount (converted to $P_2O_5$%) (mass %) | Type in Table 5 | Addition amount (converted to $NO_3$) (mass %) | |
| 1 | Z1 | 50 | B1 | 2 | S2 (100) | 30 | — | 0 | — | 0 | |
| 2 | Z1 | 20 | B1 | 2 | S2 (80) | 50 | — | 0 | — | 0 | |
| 3 | Z1 | 70 | B1 | 2 | S2 (100) | 10 | — | 0 | — | 0 | |
| 4 | Z1 | 50 | B1 | 0.1 | S2 (50) | 30 | — | 0 | — | 0 | |
| 5 | Z1 | 50 | B1 | 5 | S2 (70) | 30 | — | 0 | — | 0 | |
| 6 | Z1 | 50 | B1 | 2 | S2 (80) | 10 | — | 0 | — | 0 | |

TABLE 8-1-continued

| No. | Zr compound Type | Addition amount (ZrO₂) (mass %) | B compound Type | Addition amount (B₂O₃) (mass %) | Si compound Type* | Addition amount (SiO₂) (mass %) | P compound Type | Addition amount (P₂O₅) (mass %) | N compound Type | Addition amount (NO₃) (mass %) |
|---|---|---|---|---|---|---|---|---|---|---|
| 7 | Z1 | 40 | B1 | 2 | S2 (50) | 48 | — | 0 | — | 0 |
| 8 | Z2 | 50 | B1 | 2 | S2 (40) | 30 | — | 0 | — | 0 |
| 9 | Z3 | 50 | B1 | 2 | S2 (30) | 30 | — | 0 | — | 0 |
| 10 | Z4 | 50 | B1 | 2 | S2 (20) | 30 | — | 0 | — | 0 |
| 11 | Z5 | 50 | B1 | 2 | S2 (100) | 30 | — | 0 | — | 0 |
| 12 | Z6 | 50 | B1 | 2 | S2 (80) | 30 | — | 0 | — | 0 |
| 13 | Z1 | 50 | B1 | 2 | S1 (80) | 30 | — | 0 | — | 0 |
| 14 | Z1 | 50 | B1 | 2 | S3 (80) | 30 | — | 0 | — | 0 |
| 15 | Z1 | 50 | B1 | 2 | S4 (80) | 30 | — | 0 | — | 0 |
| 16 | Z1 | 40 | B1 | 2 | S2 (100) | 18 | P1 | 30 | — | 0 |
| 17 | Z1 | 40 | B1 | 2 | S2 (50) | 18 | P2 | 30 | — | 0 |
| 18 | Z1 | 40 | B1 | 2 | S2 (100) | 18 | — | 0 | N1 | 30 |
| 19 | Z1 | 40 | B1 | 2 | S2 (50) | 18 | — | 0 | N2 | 30 |
| 20 | Z1 | 40 | B1 | 2 | S2 (80) | 18 | — | 0 | — | 0 |

| No. | Silane coupling Agent Type in Table 6 | Addition amount (converted to solid content) (mass %) | Organic resin Type in Table 7 | Compounding amount in dry coating (mass %) | Baking temperature (° C.) | Coating amount of insulation coating (g/m²) | Remarks |
|---|---|---|---|---|---|---|---|
| 1 | — | 0 | R1 | 18 | 250 | 0.5 | Example 1 |
| 2 | — | 0 | R1 | 28 | 250 | 0.3 | Example 2 |
| 3 | — | 0 | R1 | 18 | 250 | 0.4 | Example 3 |
| 4 | — | 0 | R1 | 19.9 | 250 | 0.6 | Example 4 |
| 5 | — | 0 | R1 | 15 | 250 | 0.2 | Example 5 |
| 6 | — | 0 | R1 | 38 | 250 | 0.5 | Example 6 |
| 7 | — | 0 | R1 | 10 | 250 | 0.5 | Example 7 |
| 8 | — | 0 | R1 | 18 | 250 | 0.5 | Example 8 |
| 9 | — | 0 | R1 | 18 | 250 | 0.5 | Example 9 |
| 10 | — | 0 | R1 | 18 | 250 | 0.5 | Example 10 |
| 11 | — | 0 | R1 | 18 | 250 | 0.5 | Example 11 |
| 12 | — | 0 | R1 | 18 | 250 | 0.5 | Example 12 |
| 13 | — | 0 | R1 | 18 | 250 | 0.5 | Example 13 |
| 14 | — | 0 | R1 | 18 | 250 | 0.5 | Example 14 |
| 15 | — | 0 | R1 | 18 | 250 | 0.5 | Example 15 |
| 16 | — | 0 | R1 | 10 | 250 | 0.5 | Example 16 |
| 17 | — | 0 | R1 | 10 | 250 | 0.5 | Example 17 |
| 18 | — | 0 | R1 | 10 | 250 | 0.5 | Example 18 |
| 19 | — | 0 | R1 | 10 | 250 | 0.5 | Example 19 |
| 20 | C11 | 30 | R1 | 10 | 250 | 0.5 | Example 20 |

*Inside ( ) shows the ratio (mass %) of plate-like silica in Si compound. The remainder is S0 (colloidal silica).

TABLE 8-2

| No. | Zr compound Type in Table 3 | Addition amount (converted to ZrO₂) (mass %) | B compound Type in Table 10 | Addition amount (converted to B₂O₃) (mass %) | Si compound Type* in Table 4 | Addition amount (converted to SiO₂) (mass %) | Phosphorus compound Type in Table 5 | Addition amount (converted to P₂O₅ %) (mass %) | Nitric acid compound Type in Table 5 | Addition amount (converted to NO₃) (mass %) |
|---|---|---|---|---|---|---|---|---|---|---|
| 21 | Z1 | 38 | B1 | 2 | S2 (80) | 20 | — | 0 | — | 0 |
| 22 | Z1 | 38 | B1 | 2 | S2 (80) | 20 | — | 0 | — | 0 |
| 23 | Z1 | 50 | B1 | 2 | S2 (80) | 30 | — | 0 | — | 0 |

TABLE 8-2-continued

| No. | | | | | | | | | | |
|---|---|---|---|---|---|---|---|---|---|---|
| 24 | Z1 | 50 | B1 | 2 | S2 (80) | 30 | — | 0 | — | 0 |
| 25 | Z1 | 50 | B1 | 2 | S2 (80) | 30 | — | 0 | — | 0 |
| 26 | Z1 | 50 | B1 | 2 | S2 (80) | 30 | — | 0 | — | 0 |
| 27 | Z1 | 50 | B1 | 2 | S2 (80) | 30 | — | 0 | — | 0 |
| 28 | Z1 | 10 | B1 | 2 | S2 (80) | 30 | — | 0 | — | 0 |
| 29 | Z1 | 78 | B1 | 2 | S2 (80) | 10 | — | 0 | — | 0 |
| 30 | Z1 | 50 | B1 | 10 | S2 (100) | 30 | — | 0 | — | 0 |
| 31 | Z1 | 50 | B1 | 2 | S2 (80) | 3 | — | 0 | — | 0 |
| 32 | Z1 | 28 | B1 | 2 | S2 (80) | 60 | — | 0 | — | 0 |
| 33 | Z1 | 28 | B1 | 2 | S2 (100) | 10 | P1 | 50 | — | 0 |
| 34 | Z1 | 28 | B1 | 2 | S2 (50) | 10 | P2 | 50 | — | 0 |
| 35 | Z1 | 28 | B1 | 2 | S2 (100) | 10 | — | 0 | N1 | 50 |
| 36 | Z1 | 28 | B1 | 2 | S2 (50) | 10 | — | 0 | N1 | 50 |
| 37 | Z1 | 28 | B1 | 2 | S2 (80) | 10 | — | 0 | — | 0 |
| 38 | Z1 | 28 | B1 | 2 | S2 (80) | 10 | — | 0 | — | 0 |
| 39 | Z1 | 28 | B1 | 2 | S2 (80) | 10 | — | 0 | — | 0 |
| 40 | Z1 | 30 | B1 | 10 | only S0 | 50 | — | 0 | — | 0 |

| | Components of insulation coating | | | | | | |
|---|---|---|---|---|---|---|---|
| | Arbitrary addition component Silane coupling agent | | Organic resin | | | | |
| No. | Type in Table 6 | Addition amount (converted to solid content) (mass %) | Type in Table 7 | Compounding amount in dry coating (mass %) | Baking temperature (°C) | Coating amount of insulation coating (g/m²) | Remarks |
| 21 | C12 | 30 | R1 | 10 | 250 | 0.5 | Example 21 |
| 22 | C13 | 30 | R1 | 10 | 250 | 0.5 | Example 22 |
| 23 | — | 0 | R1 | 18 | 250 | 0.03 | Example 23 |
| 24 | — | 0 | R1 | 18 | 250 | 5 | Example 24 |
| 25 | — | 0 | R1 | 18 | 250 | 0.5 | Example 25 |
| 26 | — | 0 | R1 | 18 | 250 | 0.5 | Example 26 |
| 27 | — | 0 | R1 | 18 | 250 | 0.5 | Example 27 |
| 28 | — | 0 | R1 | 58 | 250 | 0.3 | Comparative Example 1 |
| 29 | — | 0 | R1 | 10 | 250 | 0.4 | Comparative Example 2 |
| 30 | — | 0 | R1 | 10 | 250 | 0.2 | Comparative Example 3 |
| 31 | — | 0 | R1 | 45 | 250 | 0.5 | Comparative Example 4 |
| 32 | — | 0 | R1 | 10 | 250 | 0.5 | Comparative Example 5 |
| 33 | — | 0 | R1 | 10 | 250 | 0.5 | Comparative Example 6 |
| 34 | — | 0 | R1 | 10 | 250 | 0.5 | Comparative Example 7 |
| 35 | — | 0 | R1 | 10 | 250 | 0.5 | Comparative Example 8 |
| 36 | — | 0 | R1 | 10 | 250 | 0.5 | Comparative Example 9 |
| 37 | C11 | 50 | R1 | 10 | 250 | 0.5 | Comparative Example 10 |
| 38 | C12 | 50 | R1 | 10 | 250 | 0.5 | Comparative Example 11 |
| 39 | C13 | 50 | R1 | 10 | 250 | 0,5 | Comparative Example 12 |
| 40 | — | 0 | R1 | 10 | 250 | 0.5 | Compartive Example 13 |

*Inside ( ) shows the ratio (mass %) of plate-like silica in Si compound. The remainder is S0 (colloidal silica).

TABLE 9

| No. | Corrosion resistance | Powdering resistance | Scratch resistance after annealing | Sticking resistance | TIG weldability | Punchability | Water resistance | Appearance after annealing | Remarks |
|---|---|---|---|---|---|---|---|---|---|
| 1 | ◎ | ◎ | ◎ | ◎ | ◎ | ◎ | ◎ | ◎ | Example 1 |
| 2 | ◎ | ◎ | ◎ | ◎ | ◎ | ◎ | ◎ | ◎ | Example 2 |
| 3 | ◎ | ◎ | ◎ | ◎ | ◎ | ◎ | ◎ | ◎ | Example 3 |
| 4 | ◎ | ◎ | ◎ | ◎ | ◎ | ◎ | ◎ | ◎ | Example 4 |
| 5 | ◎ | ◎ | ◎ | ◎ | ◎ | ◎ | ◎ | ◎ | Example 5 |
| 6 | ◎ | ◎ | ◎ | ◎ | ◎ | ◎ | ◎ | ◎ | Example 6 |
| 7 | ◎ | ◎ | ◎ | ◎ | ◎ | ◎ | ◎ | ◎ | Example 7 |
| 8 | ○ | ◎ | ◎ | ◎ | ◎ | ○ | ◎ | ◎ | Example 8 |
| 9 | ○ | ◎ | ◎ | ◎ | ◎ | ○ | ◎ | ◎ | Example 9 |
| 10 | ○ | ◎ | ◎ | ◎ | ◎ | ○ | ◎ | ◎ | Example 10 |
| 11 | ◎ | ◎ | ◎ | ◎ | ◎ | ◎ | ◎ | ◎ | Example 11 |
| 12 | ◎ | ◎ | ◎ | ◎ | ◎ | ◎ | ◎ | ◎ | Example 12 |
| 13 | ○ | ◎ | ◎ | ◎ | ◎ | ○ | ◎ | ◎ | Example 13 |
| 14 | ○ | ◎ | ◎ | ◎ | ◎ | ○ | ◎ | ◎ | Example 14 |
| 15 | ◎ | ◎ | ◎ | ◎ | ◎ | ◎ | ◎ | ◎ | Example 15 |
| 16 | ☆ | ◎ | ◎ | ◎ | ◎ | ◎ | ○ | ◎ | Example 16 |
| 17 | ☆ | ◎ | ◎ | ◎ | ◎ | ◎ | ○ | ◎ | Example 17 |
| 18 | ☆ | ◎ | ◎ | ◎ | ◎ | ◎ | ○ | ◎ | Example 18 |
| 19 | ☆ | ◎ | ◎ | ◎ | ◎ | ◎ | ○ | ◎ | Example 19 |
| 20 | ☆ | ◎ | ◎ | ◎ | ◎ | ◎ | ○ | ◎ | Example 20 |
| 21 | ☆ | ◎ | ◎ | ◎ | ◎ | ◎ | ○ | ◎ | Example 21 |
| 22 | ☆ | ◎ | ◎ | ◎ | ◎ | ◎ | ○ | ◎ | Example 22 |
| 23 | ○ | ◎ | ○ | ◎ | ◎ | ○ | ○ | ◎ | Example 23 |
| 24 | ◎ | ○ | ○ | ◎ | ○ | ◎ | ◎ | ○ | Example 24 |
| 25 | ◎ | ◎ | ◎ | ◎ | ◎ | ◎ | ◎ | ◎ | Example 25 |
| 26 | ◎ | ◎ | ◎ | ◎ | ◎ | ◎ | ◎ | ◎ | Example 26 |
| 27 | ◎ | ◎ | ◎ | ◎ | ◎ | ◎ | ◎ | ◎ | Example 27 |
| 28 | X | X | X | ◎ | X | ◎ | ◎ | X | Comparative Example 1 |
| 29 | X | X | X | ◎ | ◎ | ◎ | ◎ | ◎ | Comparative Example 2 |
| 30 | △ | ○ | ○ | X | ◎ | ◎ | ◎ | ◎ | Comparative Example 3 |
| 31 | △ | ○ | ○ | ◎ | △ | ◎ | ◎ | ◎ | Comparative Example 4 |
| 32 | △ | X | X | ◎ | ◎ | △ | ◎ | ◎ | Comparative Example 5 |
| 33 | △ | ○ | ○ | ◎ | ◎ | ◎ | △ | ◎ | Comparative Example 6 |
| 34 | △ | ○ | ○ | ◎ | ◎ | △ | X | △ | Comparative Example 7 |
| 35 | △ | ○ | ○ | ◎ | ◎ | ◎ | X | ◎ | Comparative Example 8 |
| 36 | △ | ○ | ○ | ◎ | ◎ | △ | X | △ | Comparative Example 9 |
| 37 | △ | ○ | ○ | ◎ | ◎ | ◎ | X | ◎ | Comparative Example 10 |
| 38 | △ | ○ | ○ | ◎ | ◎ | ◎ | X | ◎ | Comparative Example 11 |
| 39 | △ | ○ | ○ | ◎ | ◎ | ◎ | X | ◎ | Comparative Example 12 |
| 40 | X | △ | △ | △ | ○ | △ | X | X | Comparative Example 13 |

TABLE 10

| Symbol | Name | Chemical formula |
|---|---|---|
| B1 | Boric acid | $H_3BO_3$ |

As shown in Table 9, all of our magnetic steel sheets with a semi-organic insulation coating are excellent in not only corrosion resistance and powdering resistance, but also scratch resistance after stress relief annealing, sticking resistance, TIG weldability, punchability and water resistance, and further excellent in appearance after stress relief annealing.

On the other hand, Comparative Examples 1 and 2, wherein the amount of Zr compound is out of the adequate range, are particularly poor in the corrosion resistance, powdering resistance and scratch resistance after annealing. Comparative Example 1 is also poor in the TIG weldability and appearance after annealing.

Also, Comparative Example 3, wherein the amount of B compound is more than the upper limit, is particularly poor in the sticking resistance.

Comparative Example 4, wherein the amount of Si compound is less than the lower limit, is poor in the corrosion resistance and TIG weldability, while Comparative Example 5, wherein the amount of Si compound is more than the upper limit, is particularly poor in the powdering resistance and scratch resistance after annealing.

Furthermore, all of Comparative Examples 6 to 12 containing an amount of nitric acid compound or silane coupling agent or phosphorous compound exceeding over the adequate range are poor in the corrosion resistance and water resistance.

Moreover, Comparative Example 13 using only colloidal silica without plate-like silica as an Si compound is particularly poor in the corrosion resistance, water resistance and appearance after annealing, and is also not as good as our Examples in powdering resistance, scratch resistance after annealing, sticking resistance and punchability.

The invention claimed is:

1. A magnetic steel sheet having on a surface thereof a semi-organic insulation coating comprising an inorganic component and an organic resin, wherein the inorganic component of the semi-organic insulation coating comprises a Zr compound, an Si compound containing a plate-like silica, and a B compound as a ratio in a dry coating of 20-70 mass % of the Zr compound (converted to $ZrO_2$), 10-50 mass % of the Si compound containing the plate-like silica (converted to $SiO_2$), and 0.1-5 mass % of the B compound (converted to $B_2O_3$), and the remainder of the semi-organic insulation coating is the organic resin, the Zr compound includes at least one of ammonium zirconium carbonate, potassium zirconium carbonate, zirconium acetate, zirconium sulfate, zirconium nitrate and potassium zirconium hexafluoride, the B compound is boric acid, and the organic resin includes at least one of epoxy resin, polyester resin, acryl resin and urethane resin.

2. The magnetic steel sheet according to claim 1, wherein the plate-like silica has an average particle size of 10 to 600 nm.

3. The magnetic steel sheet according to claim 2, wherein the plate-like silica has an aspect ratio (average length/average thickness ratio) of 2 to 400.

4. The magnetic steel sheet according to claim 2, wherein the semi-organic insulation coating further comprises not more than 30 mass % in total of one or more selected from the group consisting of a nitric acid compound (converted to $NO_3$), a silane coupling agent (converted to a solid content) and a phosphorus compound (converted to $P_2O_5$) in a dry coating.

5. The magnetic steel sheet according to claim 1, wherein the plate-like silica has an aspect ratio (average length/average thickness ratio) of 2 to 400.

6. The magnetic steel sheet according to claim 5, wherein the semi-organic insulation coating further comprises not more than 30 mass % in total of one or more selected from the group consisting of a nitric acid compound (converted to $NO_3$), a silane coupling agent (converted to a solid content) and a phosphorus compound (converted to $P_2O_5$) in a dry coating.

7. The magnetic steel sheet according to claim 1, wherein the semi-organic insulation coating further comprises not more than 30 mass % in total of one or more selected from the group consisting of a nitric acid compound (converted to $NO_3$), a silane coupling agent (converted to a solid content) and a phosphorus compound (converted to $P_2O_5$) in a dry coating.

* * * * *